(12) United States Patent
Kounev et al.

(10) Patent No.: US 11,438,773 B2
(45) Date of Patent: Sep. 6, 2022

(54) GEOSPATIAL-BASED FORECASTING FOR ACCESS POINT DEPLOYMENTS

(71) Applicant: AT&T Intellectual Property I, L.P., Atlanta, GA (US)

(72) Inventors: Velin Kounev, Weehawken, NJ (US); Yaron Kanza, Fair Lawn, NJ (US); Arun Jotshi, Parsippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 92 days.

(21) Appl. No.: 17/105,939

(22) Filed: Nov. 27, 2020

(65) Prior Publication Data
US 2022/0174502 A1     Jun. 2, 2022

(51) Int. Cl.
*H04W 16/18*    (2009.01)
*G06N 20/00*    (2019.01)
*H04W 24/08*    (2009.01)

(52) U.S. Cl.
CPC ............ *H04W 16/18* (2013.01); *G06N 20/00* (2019.01); *H04W 24/08* (2013.01)

(58) Field of Classification Search
None
See application file for complete search history.

(56) References Cited

U.S. PATENT DOCUMENTS

| | | | |
|---|---|---|---|
| 10,685,260 B1 * | 6/2020 | Adelaar | G06F 16/951 |
| 2019/0130423 A1 * | 5/2019 | Watanabe | G06Q 30/0201 |
| 2019/0355015 A1 * | 11/2019 | Dashevskiy | G06Q 30/0254 |

OTHER PUBLICATIONS

"Esri Location Analytics", Esri (2019), 1 page, downloaded from https://www.esri.com/content/dam/esrisites/en-us/media/pdf/esri-location-analytics2.pdf on Aug. 12, 2021.
"Telecoms", Wiki, 19 pages, downloaded from https://wiki.openstreetmap.org/wiki/Telecoms, Nov. 25, 2021.
Thatcher, "Uinta Mapping Software for telecom and fiber mapping", Official Blog of Juniper Systems, Jul. 30, 2021, 5 pages, https://blog.junipersys.com/uinta-mapping-software-for-telecom-and-fiber-mapping.
"Telecommunications Mapping Software", Caliper Corporation, Maptitude Mapping Software, downloaded from https://www.caliper.com/maptitude/solutions/telecommunications-mapping-software.htm on Aug. 12, 2021, 4 pages.

* cited by examiner

*Primary Examiner* — Adolf Dsouza

(57) ABSTRACT

A processing system may obtain usage volume information for endpoint devices for at least one cell site of a cellular network, determine at least one earning value of the at least one cell site based upon a summation of an earning metric of each of the endpoint devices for the at least one cell site, the earning metric comprising for each of the endpoint devices in a given time period: a total earning for the cellular network from the endpoint device times a ratio of the usage volume via the at least one cell site divided by the total usage volume via the cellular network, train a prediction model to predict an earning value of a new cell site, based upon geospatial features of the at least one cell site as predictor factors, and determine a predicted earning value of the new cell site via the prediction model.

20 Claims, 4 Drawing Sheets

GEOSPATIAL-BASED FORECASTING FOR ACCESS POINT DEPLOYMENTS

The present disclosure relates generally to telecommunication network operations, and more particularly to methods, computer-readable media, and apparatuses for training a prediction model and determining a predicted earning value of a new cell site in a time interval by applying geospatial features of the new cell site as inputs to the prediction model and obtaining the predicted earning value as an output, and to methods, computer-readable media, and apparatuses for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
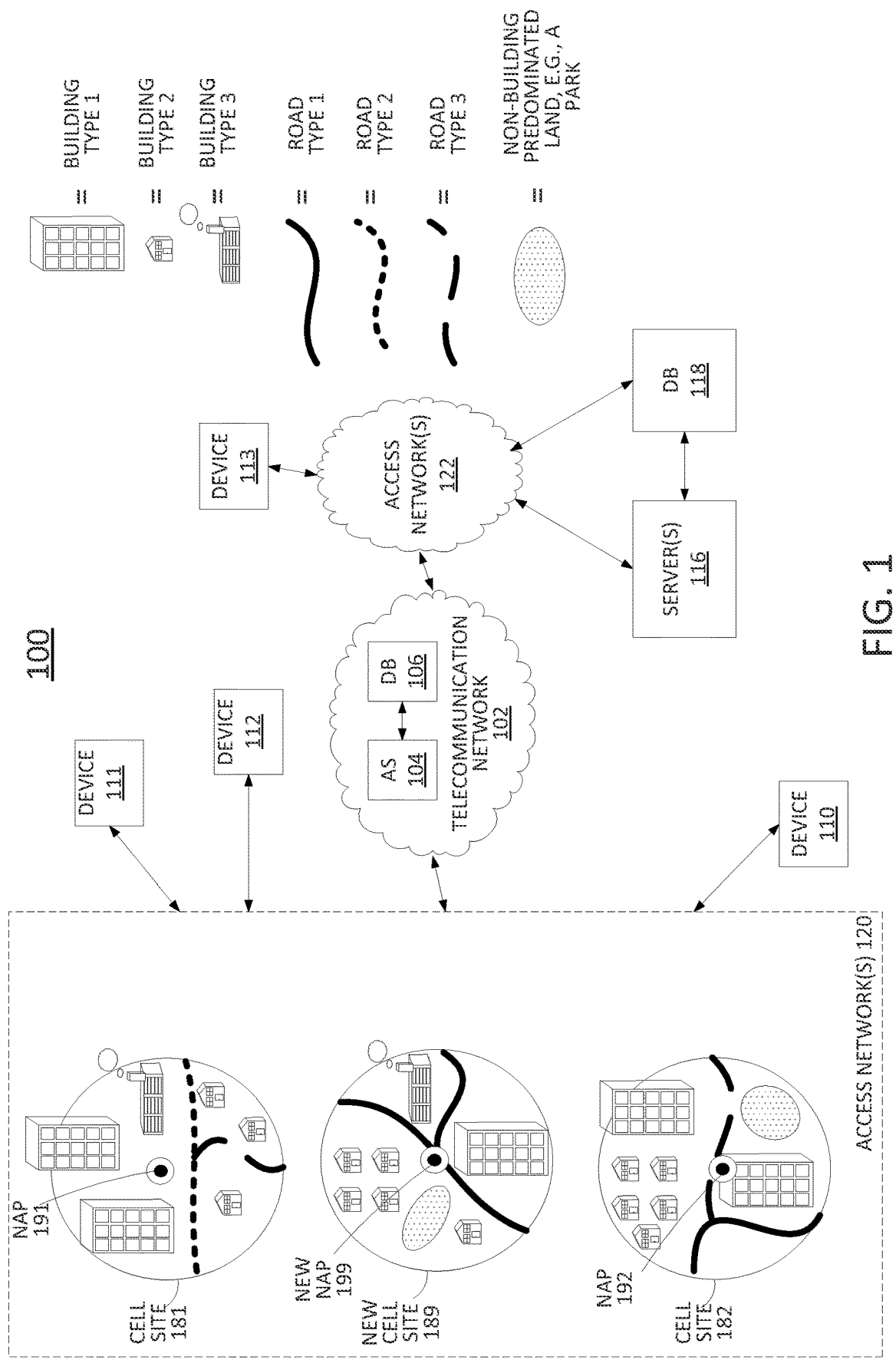
FIG. 1 illustrates an example system related to the present disclosure.

In one example, the present disclosure describes a method, computer-readable medium, and apparatus for training a prediction model and determining a predicted earning value of a new cell site in a time interval by applying geospatial features of the new cell site as inputs to the prediction model and obtaining the predicted earning value as an output. For example, a processing system having at least one processor may obtain usage volume information for a plurality of endpoint devices for at least one cell site of a cellular network. For each of the plurality of endpoint devices the usage volume information may comprise a total usage volume via the cellular network in a given time period and a usage volume via the at least one cell site in the given time period. The processing system may next determine at least one earning value of the at least one cell site in the given time period based upon a summation of an earning metric of each of the plurality of endpoint devices for the at least one cell site, where the earning metric comprises for each of the plurality of endpoint devices: a total earning for the cellular network from the endpoint device in the given time period times a ratio of the usage volume via the at least one cell site in the given time period divided by the total usage volume via the cellular network in the given time period. The processing system may then train a prediction model to predict an earning value of a new cell site, where the prediction model is trained based upon geospatial features of the at least one cell site as predictor factors of the at least one earning value of the at least one cell site, and determine a predicted earning value of the new cell site in a time interval via the prediction model, by applying geospatial features of the new cell site as inputs to the prediction model and obtaining the predicted earning value as an output of the prediction model.

In another example, the present disclosure describes a method, computer-readable medium, and apparatus for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance. For example, a processing system having at least one processor may obtain usage volume information for a plurality of endpoint devices receiving services from at least one cell site of a cellular network when determined to be present within at least a first instance of at least a first type of geospatial category within the at least one cell site, where for each of the plurality of endpoint devices the usage volume information comprises a total usage volume via the cellular network in a given time period and a usage volume when determined to be present within the at least the first instance of the at least the first type of geospatial category within the at least one cell site in the given time period. The processing system may next determine at least a first earning value of the at least the first instance of the at least the first type of geospatial category in the given time period based upon a summation of a first earning metric of each of the plurality of endpoint devices for the at least the first instance of the at least the first type of geospatial category. The first earning metric may comprise for each of the plurality of endpoint devices: a total earning for the cellular network from the endpoint device in the given time period times a ratio of the usage volume when determined to be present within the at least the first instance of the at least the first type of geospatial category in the given time period divided by the total usage volume via the cellular network in the given time period. The processing system may then identify at least a second instance of the at least the first type of geospatial category within a candidate cell site, and determine a predicted earning value of the candidate cell site in a time interval based upon the at least the first earning value and a first scaling factor based upon a size of the at least the second instance and a size of the at least the first instance.

Deploying, upgrading, and extending communication networks are expensive operations. There are high costs involved in the design and planning of networks, purchase of network elements, installation of elements like antennas, fibers, wireless connections, routers, switches and other network functions. The maintenance and operations of the network incur high costs as well, including costs like power, cooling, taxes, fees, etc. Thus, network planning decision may be based not just on the cost of the equipment and the installation, but also on the potential earning from each item. However, it is challenging to attribute network revenues across individual pieces of equipment. In addition, it may be even more challenging to forecast the potential earning when deploying new equipment, such as a new network access point. Examples of the present disclosure learn the earning value of a given cellular network access point (e.g., earnings before interest, taxes, depreciation, and amortization (EBITDA), or the like) based on the users that it serves. Network access points may broadly comprise at least one antenna (or antenna array), may comprise multiple antennas in one or more sectors, and may further include towers, rooftop installations, and/or indoor solutions that contain several antennas (broadly, "network access points"). Thus, given a location in which there is no network access point, the present disclosure forecasts the potential earning value of a new network access point at such location. Based on this potential earning value, network configuration decisions of the cellular network may be made. In one example, to estimate the value of an existing network access point, the present disclosure may first identify the customers (or endpoint devices) the network access point serves, and obtain usage volume information for such endpoint devices, from which the effect of the network access point on the total revenue of the network may be determined. While there is some lack of precision in this estimate, the earning values can still support decision making since network access points may be compared to one another.

To illustrate, in one example, let C be the set of all the customers (e.g., subscribers) of the cellular network. In one example, there are two types of customers with two different payment methods—prepaid and postpaid. Let p(c) be the monthly payment of a postpaid customer c in C. Similarly, let p(c) be the cost of a prepaid card for a prepaid customer. To estimate the earning of each network access point, in one example, the present disclosure divides the gain from the customers between the network access points the customers are using, according to the amounts of use.

Earning by call number—In one approach, the present disclosure estimates a contribution of network access point to a revenue from an endpoint device in a given time period (e.g., a monthly billing cycle) as follows. Given a network access point (e.g., an antenna) A, for each postpaid endpoint device d, the payment of d is multiplied by the ratio of (1) the number of calls of d that were served by A and (2) the total number of calls of d. This can be the monthly average for the postpaid customer. For a prepaid endpoint device d, the prepaid value is multiplied by the ratio of the number of calls of d using network access point A and the total number of calls of d. In one example, both options are represented by Equation 1:

Earning of A from d=payment per device d*(calls of d through A/total number of calls of d)   Equation 1:

Earning by data volume—In a second example, instead of relating to the number of calls, the effect of a network access point on the revenue from a given endpoint device is measured by the volume of data served via the network access point; that is, the total gigabytes (or other metrics) of information that the network access point sent and received from the endpoint devices in the area of coverage of the network access point (broadly a "cell site"). Given a network access point A, for each postpaid endpoint device d, the payment of d is multiplied by the ratio of (1) the data that device d sent or received via A and (2) the total amount of data that d sent or received via any network access point. This can be based on the monthly average. For a prepaid endpoint device d, the prepaid value is multiplied by the ratio of volume of data transfer of d via network access point A and the total volume of data sent or received by d through any network access point. In one example, both options are represented by Equation 2:

Earning of A from d=payment per device d*(volume of data of d through A/total volume of data of d)   Equation 2:

Earning by service time—In a third example, instead of relating to the number of calls, the effect of a network access point on the revenue from a given endpoint device is measured by service time; that is, the total time that the endpoint device was connected to the network access point and received service from it during the given time period. Given a network access point A, for each postpaid endpoint device d, the payment of d is multiplied by the ratio of (1) the time that endpoint device d received service by A and (2) the total time that d received service from any network access point. This can be based on the monthly average of the service time. For a prepaid endpoint device d, the prepaid value is multiplied by the ratio of the service time of d via network access point A and the total service time of d through any network access point. In one example, both options are represented by Equation 3:

Earning of A from d=payment per device d*(service time of d through A/total service time of d)   Equation 3:

The service time that network access point A provides to endpoint device d can be measured as the time when there are active calls and data transfer from the endpoint device d to the network access point A, and from A to d. The service time can also be measured as the total time that the endpoint device was near the network access point and received connectivity service from it.

Threshold—For all three examples above (earning by call number, earning by data volume and earning by service time), in one example, if for some endpoint device d and network access point A the percentage of serviced calls by A among all calls of d or the percentage of data transfer or the percentage of service time by A per the entire service time to d exceeds a given threshold, the entire payment of d may be attributed to the earning of A. For instance, if endpoint device d conducts 70% of all calls in a given month via network access point A, then without network access point A, the owner of d will probably churn to a different network, so all the revenue from d can be attributed to network access point A.

Total Earning—The total earning of a network access point in a given time period is the sum of earning from all endpoint devices that it serves in the given time period. Thus, the total earning for the network access point may be computed as the sum of the contributions based on time, volume of data or number of calls, per any of Equations 1-3 above, summed over all endpoint devices served by the network access point in the given time period. In one example, for any given network access point the maximum value per any of Equations 1-3 may be selected as the earning value of the network access point for each endpoint device in the given time period. For instance, this may be represented by Equation 4.

Total earning for network access point
$A = \Sigma_{all\ devices\ d}(\max\{E_c(A,d), E_d(A,d), E_t(A,d)\})$   Equation 4:

In another example, when computing the total earning value of a network access point in a given time period, the maximum of $E_c(A,d)$, $E_d(A,d)$, $E_t(A,d)$ can be replaced by three averages or by a weighted average of the three metrics.

For instance, a weighting may be set by a network operator according to the important of each one to the network operator, e.g., per Equation 5:

$$\text{Total earning for antenna } A = \Sigma_{all\ devices\ d}(w_c \times E_c(A,d) + w_d \times E_d(A,d) + w_t \times E_t(A,d))/(3(w_c + w_d + w_t))) \quad \text{Equation 5:}$$

For example, if it is important to provide coverage to devices at almost all times, the weight of $E_t(A,d)$ could be increased. If data usage is more important, than the weight on $E_d(A,d)$ could be higher than the other two weights.

The foregoing describes examples of determining earning value per network access point for network access point having available data from which such a determination may be made. However, for network planning, this type of data does not exist for places where there are no network access points. Thus, as noted above, the present disclosure forecasts the earning value in different places for possible locations of new network access points.

To illustrate, for a possible new network access point location, the present disclosure may utilize geospatial features of the area that is covered by the network access point, e.g., a cell, or cell site. In one example, geospatial information about the area is obtained from a detailed map and/or aerial photos of the area. In one example, the estimation involves evaluation of the number of users in the examined area and the amount of time such users may spend in that area (derived from the geospatial features). Based on these calculations, the potential earning value of the new network access point in a given time interval may be estimated. In accordance with the present disclosure, no customer identifying information is used, and the privacy of all users and all customers is strictly maintained.

In one example, estimation is conducted through the following steps. First, earnings values of network access points having known data are calculated (e.g., as per the above). Next, the present disclosure may train a prediction model to predict an earning value of a new cell site/new network access point, where the prediction model is trained based upon geospatial features of cell sites of existing network access points as predictor factors of network access point earning value. The existing network access points may be selected from a threshold distance around the location of the new network access point, or a prediction model may be pre-trained for a particular zone or region of the network in which the new network access point may be deployed. The geospatial features may include a number of buildings of each of a plurality of building types of a given cell site, a size of the buildings of each of the plurality of building types of the given cell site, a length of roads of each of a plurality of road types of the given cell site, a volume of at least one non-building-predominated land type (e.g., park space, farmland, natural preserved space, etc.), and so on.

The geospatial features may be determined from one or more maps including labels of geospatial features in the cell site, and/or may be determined from one or more aerial images. For instance, if the map(s) is/are incomplete, one or more aerial images may be applied to one or more ML-classifiers for detecting buildings in the area and their features, such as type of building, footprint, and estimated number of floors, for detecting road, road types, and their lengths, and/or for detecting non-building-predominated lands, the land types, and the areas/sizes of such spaces. In one example, the one or more ML-classifiers may comprise one or more deep neural networks (DNNs) (e.g., a convolutional neural network (CNN), region detection using CNN (R-CNN), Fast-CNN, etc.). In one example, the detection of a building and its type may use a first detection model and the extraction of each feature may use a different model. The ML-classifier models may be trained on aerial images for areas in which the information on buildings is complete and accurate (e.g., from the one or more maps). In one example, the present disclosure may determine the building's total floor area, e.g., by multiplying the area according to the building footprint by the number of floors in the building.

It should be noted that the ML-classifier models for detecting geospatial features in aerial images are different from the prediction model that uses such geospatial features as predictors for an earning values of a network access point/cell site. In particular, the geospatial features of cell sites of existing network access points may be extracted from one or more maps and/or one or more aerial images. Then, these geospatial features and associated earning value for each of a plurality of existing network access points (or the associated coverage area/cell site) are used as examples to train the prediction model to predict (output) a forecast earning value given a set of input geospatial features. The prediction model may comprise, for example, a convolutional neural network (CNN), or the like. The number of layers, the number of cells per layer, and so forth may be set based upon a variety of considerations, such as a desired accuracy, computation time, etc. However, such a prediction model may have a different form in accordance with the present disclosure, such as a support vector machine (SVM), e.g., a binary, non-binary, or multi-class classifier, a linear or non-linear classifier, and so forth. It should be noted that various other types of machine learning algorithms (MLAs) and/or machine learning models (MLMs) may be implemented in examples of the present disclosure, such as k-means clustering and/or k-nearest neighbor (KNN) predictive models, support vector machine (SVM)-based classifiers, e.g., a binary classifier and/or a linear binary classifier (e.g., high revenue vs. low revenue network access points, where the cutoff may be predefined by the network operator), a multi-class classifier, a kernel-based SVM, etc., a distance-based classifier, e.g., a Euclidean distance-based classifier, or the like, and so on. For instance, geospatial features of an area may be represented as a vector or point in a feature space, and the earning value may be calculated based upon a distance of the vector/point to a separation hyperplane in the feature space (e.g., where the separation hyperplane may represent the cutoff between high earning value and low earning value as defined by the network operator). In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth.

Accordingly, for a new network access point, the coverage area/cell site (if the new network access point were deployed) is identified and geospatial features are extracted (e.g., in the same or similar manner as described above, using one or more maps and/or one or more aerial images). Applying these geospatial features as inputs to the trained prediction model, the prediction model may output a forecast earning value (for a given time period) for the new network access point if deployed at the selected location.

In another example, estimation is conducted through the following steps. First, estimate the number of devices per building type and building size, e.g., for a building type like department store, train station, or office building estimate the number of devices in the place divided by the square footage of the building. This estimation is based on the count of unique devices seen in such types of buildings in areas where there are antennas/network access points.

In one example, the present disclosure may first find all the buildings in the area. If the map (or maps) is/are complete, all the buildings should be in the map(s). If the map(s) is/are incomplete, one or more aerial images may be applied to one or more ML-classifiers for detecting buildings in the area and their features: type of building, footprint, and estimated number of floors. In one example, the one or more ML-classifiers may comprise one or more deep neural networks (DNNs) (e.g., a convolutional neural network (CNN), R-CNN, Fast-CNN, etc.). In one example, the detection of a building and its type may use a first detection model and the extraction of each feature may use a different model. The ML-classifier models may be trained on aerial images for areas in which the information on buildings is complete and accurate (e.g., from the one or more maps). In one example, the present disclosure may determine the building's total floor area, e.g., by multiplying the area according to the building footprint by the number of floors in the building.

In one example, for each building type, the present disclosure may estimate the average time that an endpoint device is in the building. For example, the average stay time of an endpoint device may be 45 minutes in a department store, 9 hours in an office building, and 15 minutes in a train station. For each building, the present disclosure may estimate the number of calls that a device is performing, based on data from places where there are similar network access points. In addition, for each building, the present disclosure may estimate the volume of data that a device is consuming, based on data from places where there are network access points. Based on the above steps, the present disclosure may then compute an estimation of the number of devices, the number of calls per device, the volume of data, and the service time per device for buildings in the examined area.

Similarly, in one example, the present disclosure may find the roads in the area, their lengths (and/or areas), and their types (e.g., highway, municipal road, service road, etc.). If the information is not available on the map(s), one or more ML-classifiers model may be deployed to discover this information from one or more aerial images of the area. In one example, the present disclosure may, for each road type, estimate the number of endpoint devices per distance, e.g., 100 devices per mile. This can be based on counts for roads that are already covered by an existing network access point. Next, the present disclosure may estimate the average service time, average data usage, and the average number of calls, per device and mile of road, for roads of different types. Based on the road lengths, road types, and density of devices on the road, the present disclosure may then estimate the number of devices, the service time, the data usage, and the number of calls.

Lastly, the present disclosure may compute an estimated earning value of a new network access point based on (a) the average payment per device multiplied by the estimated number of devices and the average number of calls/service time per devices in buildings in the coverage area (e.g., cell site) of the new network access point, and (b) the average payment per device, the expected number of devices per road distance multiplied by the length of the roads in the area (e.g., in the cell site/coverage area), and the expected number of calls/service time per device per mile.

Adoption of new technology—There are sometimes different payment models based on technology. For instance, a 5G plan could have different payment model than a 4G plan. In that case, the estimation model may also account for the distribution of plan types in the analyzed area, and the expected adoption of new technologies. Both the adoption rate of new technologies and the distribution of technologies across devices may be determined based on statistics for areas where the information is available and using the numbers in similar areas. For example, if in a first area there is adoption rate of new technologies of 5% per year and a second area is similar to the first area, then the adoption rate of the first area may also be assigned to the second area. Similarity between areas is computed based on parameters such as: population density, type of area (e.g., urban, suburbs, rural), survey data regarding new technologies and early technology adoption estimates based on such survey data, types of usage and of applications in the area, if available (e.g., the distribution of data usage for streaming video, streaming audio, gaming, voice calls, text messages, etc., which can be based on surveys or real measurements), the type of existing cellular plans for people in the area (the distribution), and so forth. To find the effect of these features on similarity, an ML model may be trained based on places where similarity is known, and may then be applied to testing similarity in places where the information is missing. In addition, a telecommunication network operator may offer paid-for services that are provided using the network, such as a streaming media service. Customers may use these services at different locations for an additional fee. The predicted earning might take usage of such services and applications into account. The usage can be measured in areas where there are antennas, and a prediction model can be trained and applied to potential new cellular sites. Note that the existence of cellular reception might be required for accessing the service from the considered location and paying for the service.

Seasonality—Some of the computed values are affected by seasonality. For example, some tourist areas are very active during the summer but are not as active during other times of the year. Some places, like ski resorts, are more active during the winter than during other seasons. Some worship places can be more crowded during religious holidays than during workdays, and so on. One approach to cope with seasonality is to measure the average usage over a longer period of time, say a year, and to employ this metric in the calculations. Notably, using an average may give the same weight to times in which there is high activity and times where the activity is low. In one example, a weighted average may be used instead, where the earning computed for each time period is multiplied by a weight that expresses the significance of the earning during that time period. For example, if $E_1, \ldots, E_{12}$ are the earning values for January, . . . , December, respectively, then the weighted computation of the earning may be calculated as follows:

$$w_1 \times E_1 + \ldots + w_{12} \times E_{12}, \text{ such that for all } i, 0 \leq w_i \leq 1$$
$$\text{and } w_1 + \ldots + w_{12} = 1 \quad \quad \text{Equation 6:}$$

For computing the earning values in places where there is seasonality, the number of users during different times may be determined. In places where there are nearby network access points, the estimation may be based on the number of devices seen at each time by the closest antenna and/or network access point to the location that is considered. For isolated places, like resorts, if there is no nearby antenna, or network access point, the estimation may be based on either surveys or by counting the number of cars in the area at different times. For example, counting the number of cars may be accomplished by applying an ML model like, such as a convolutional neural network (CNN) for detecting cars, to one or more aerial images of the area of interest. According to the location type, the number of people per car may be estimated, and the estimated crowd size may be calculated by multiplication of the number of detected cars by the expected number of people per car. Other estimation methods of the number of people in the area at different times can be used as well.

Costs—As explained above, an EBITDA computation for a network access point may account not for just the earning, but also the costs of installing, operating, and maintenance of equipment in different places. It may include power costs, taxes, municipal and other fees, etc. These costs may be either known or estimated based on the costs in existing nearby network access points. These and other aspects of the present disclosure are described in greater detail below in connection with the examples of FIGS. 1-4.

To aid in understanding the present disclosure, FIG. 1 illustrates an example system 100 in which examples of the present disclosure for training a prediction model and determining a predicted earning value of a new cell site in a time interval by applying geospatial features of the new cell site as inputs to the prediction model and obtaining the predicted earning value as an output, and/or for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance may operate. The system 100 may include any one or more types of communication networks, such as a circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a telecommunication network 102. The telecommunication network 102 may be in communication with one or more access networks 120 and 122, and the Internet (not shown). In one example, telecommunication network 102 may combine core network components of a cellular network with components of a triple play service network; where triple-play services include telephone services, Internet services and television services to subscribers. For example, telecommunication network 102 may functionally comprise a fixed mobile convergence (FMC) network, e.g., an IP Multimedia Subsystem (IMS) network. In addition, telecommunication network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 102 may further comprise a broadcast television network, e.g., a traditional cable provider network or an Internet Protocol Television (IPTV) network, as well as an Internet Service Provider (ISP) network. In one example, telecommunication network 102 may include a plurality of television (TV) servers (e.g., a broadcast server, a cable head-end), a plurality of content servers, an advertising server, an interactive TV/video on demand (VoD) server, and so forth. For ease of illustration, various additional elements of telecommunication network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute for Electrical and Electronics Engineers (IEEE) 802.11/Wi-Fi network and the like), cellular access networks, $3^{rd}$ party networks, and the like. For example, the operator of telecommunication network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one embodiment, the telecommunication network 102 may be operated by a telecommunication network service provider. The telecommunication network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access networks 120 may be in communication with one or more devices 110-112. Similarly, access networks 122 may be in communication with one or more devices, e.g., device 113. Access networks 120 and 122 may transmit and receive communications between devices 110-113, between devices 110-113, and components of telecommunication network 102, devices reachable via the Internet in general, and so forth. In one example, each of the devices 110-113 may comprise any single device or combination of devices that may comprise a user endpoint device. For example, the devices 110-113 may each comprise a mobile device, a cellular smart phone, a laptop, a tablet computer, a desktop computer, an application server, a bank or cluster of such devices, and the like.

In one example, the access networks 122 may also be in communication with one or more servers 116 and one or more databases (DBs) 118. The server(s) 116 and DB(s) 118 may comprise or be associated with, for example, one or more geographic information systems (GIS)s, e.g., one or more map sources and/or one or more aerial image sources. In one example, DB(s) 118 may comprise physical storage device(s) integrated with server(s) 116 (e.g., a database servers), or attached or coupled to the server(s) 116. For instance, DB(s) 118 may store and provide one or more map databases, such as the United States Geological Survey (USGS) National Transportation Dataset (NTD), ArcGIS, HERE map database, and so forth. In one example, such databases may include or comprise a digital elevation model (DEM), which may comprise a set of raster files or other format files, that records elevations for a set of given points (latitude, longitude). Similarly, DB(s) 118 may store and provide aerial image data, which may include satellite images and/or aerial vehicle-obtained images.

Figure 2:
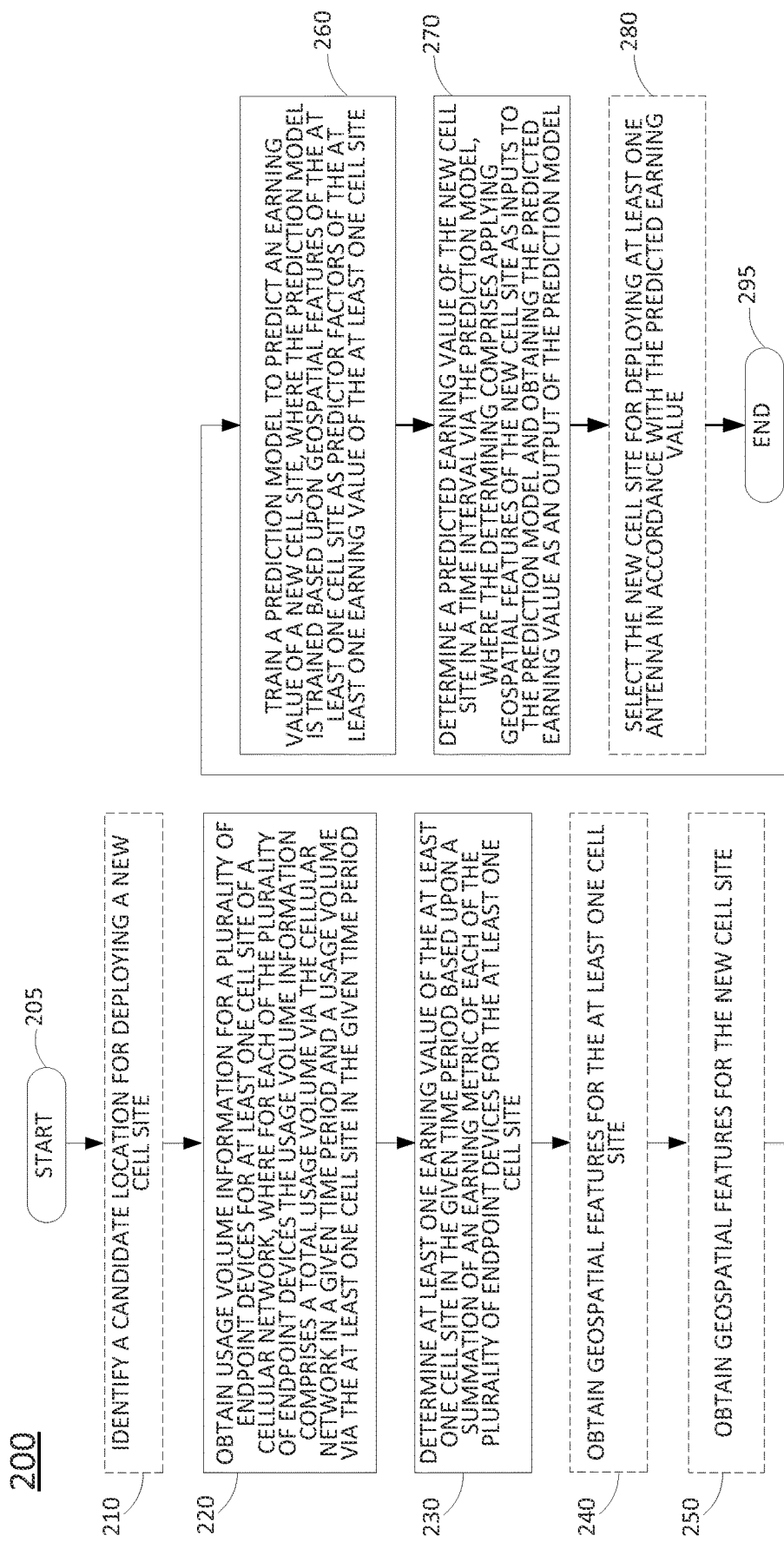
FIG. 2 illustrates a flowchart of an example method for training a prediction model and determining a predicted earning value of a new cell site in a time interval by applying geospatial features of the new cell site as inputs to the prediction model and obtaining the predicted earning value as an output.
Figure 3:
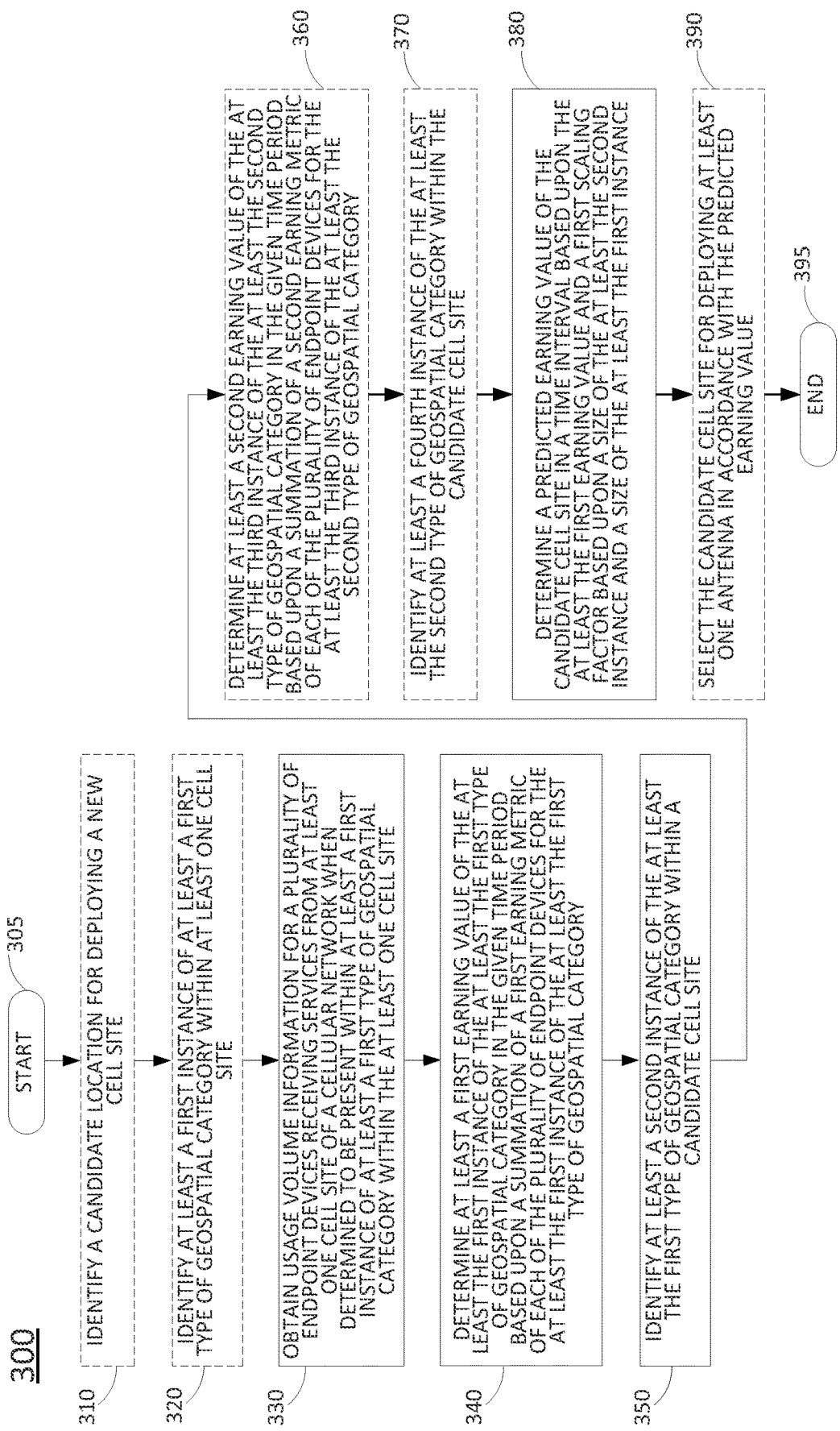
FIG. 3 illustrates a flowchart of an example method for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance.
Figure 4:
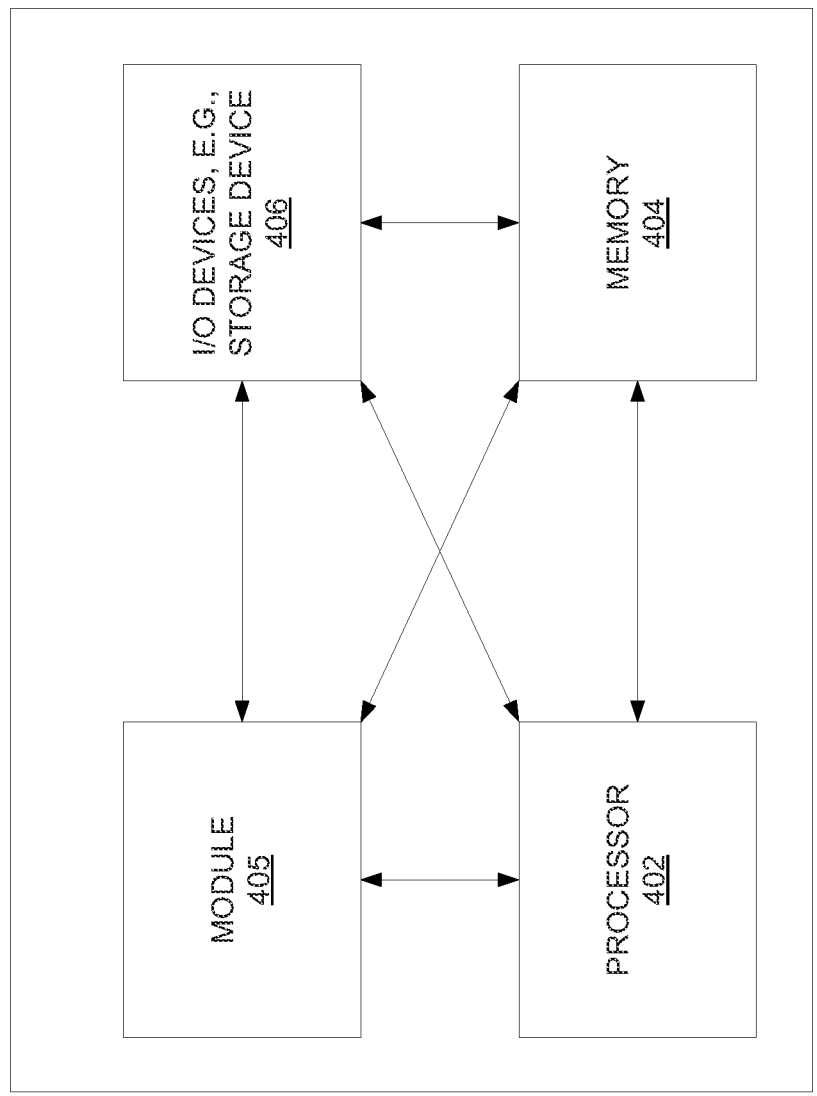
FIG. 4 illustrates a high level block diagram of a computing device specifically programmed to perform the steps, functions, blocks and/or operations described herein.

In one example, telecommunication network 102 may also include an application server (AS) 104 and one or more databases (DBs) 106. In one example, the application server 104 may comprise a computing device or processing system, such as computing system 400 depicted in FIG. 4, and may be configured to perform one or more steps, functions, or operations for training a prediction model and determining a predicted earning value of a new cell site in a time interval by applying geospatial features of the new cell site as inputs to the prediction model and obtaining the predicted earning value as an output, and/or for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance. For instance, an example method for training a prediction model and determining a predicted earning value of a new cell site in a time interval by applying geospatial features of the new cell site as inputs to the prediction model and obtaining the predicted earning value as an output is illustrated in FIG. 2 and described below. Similarly, an example method for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance is illustrated in FIG. 3 and described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, DB(s) 106 may comprise physical storage device(s) integrated with AS 104 (e.g., a database server), or attached or coupled to AS 104, to store various types of information in support of systems for training a prediction model and determining a predicted earning value of a new cell site in a time interval by applying geospatial features of the new cell site as inputs to the prediction model and obtaining the predicted earning value as an output, and/or for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance. For instance, DB(s) 106 may obtain and store the same or similar information as DB(s) 118. In one example, AS 104 may obtain such information from server(s) 116 and/or DB(s) 118 and may store the information at DB(s) 106.

In one example, DB(s) 106 may also store ML-classifiers/detection models for detecting one or more geospatial features in overhead/aerial images (e.g., satellite and/or aerial vehicle-obtained images). As such, these detection models may be accessed by AS 104 and used to detect different geospatial features by AS 104 in overhead images. DB(s) 106 may also store usage data collected from different network access points, or cell sites within system 100. In addition, DB(s) 106 may store user, customer, and/or subscriber account records which may include information relating to customer identification, endpoint devices associated with accounts, service addresses and/or billing addresses, service charges (e.g., monthly fees, or the like), add-on features, such as international calling plans, added security features, etc. Such records may also include usage data relating to calls made within a record retention time period, the duration of such calls, the cell sites/network access points via which such calls were conducted, etc. Similarly, such records may also include usage data relating to a data utilization over various time periods. This may include a data volume exchanged via each network access point that serviced a given endpoint device of a particular account, as well as a total data volume associated with the endpoint device across the entire system 100 during the given time period. In still another example, such records may alternatively or additionally include service connection times for which a given endpoint device is attached to a particular network access point for service (as well as a total time attached to any network access point of the system 100).

In connection with examples of the present disclosure for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance (e.g., as illustrated in FIG. 3 and described in greater detail below), DB(s) 106 may also store information that relates to a volume of calls, a data volume, and/or a duration of service time as it relates to endpoint devices when present at instances of different types of geospatial categories, e.g., buildings of different building types, roads of different road types, etc. In this regard, FIG. 1 includes examples of three different building types, three different road types, and a geospatial category of "non-building predominated land" (e.g., parks, wetlands, nature preserves, etc.).

To further illustrate, in the example of FIG. 1 access networks 120 includes cell sites 181 and 182 having network access points (NAPs) 191 and 192, respectively. Each of the cell sites 181 and 182 includes combinations of different instances of different types of geospatial features (which also have different sizes). For instance, cell site 181 includes two instances of building type 1, three instances of building type 2, one instance of building type 3, one instance of road type 2, and one instance of road type 3. Cell site 182 likewise includes various instances of different geospatial features. In one example, AS 104 may determine the geospatial makeup of cell sites 181 and 182 via one or more maps and/or via one or more aerial/overhead images. For instance, one or more maps with labels of different geospatial features (e.g., instances of different types of geospatial categories) may be retrieved from DB(s) 118 and/or obtained from DB(s) 106. In one example, the sizes of different instances of different types of geospatial categories may also be indicated/labeled on the map(s), such as a footprint/area of a building, the number of floors/stories of a building, a length, number of lanes, and/or area of road, an area of a park or other types of non-building predominated land, etc. In one example, aerial/overhead images may be obtained from DB(s) 118.

AS 104 may then determine various instances of different types of geospatial categories (e.g., buildings of building type 1, buildings of building type 2, roads of road type 1, roads of road type 2, etc.) using ML-classifiers/detection models for processing such images. In addition, as noted above, in one example, the same or different ML-classifiers/ detection models may also be applied to determine the sizes of these different instances of different types of geospatial categories (e.g., the footprint/area of buildings, the number of stories/floors of buildings, lengths, lanes, and/or areas of roads, areas of parks or other types of non-building predominated lands, etc.). In one example, learned geospatial features may then be added as labels to the one or more maps that may be incomplete (or may be used to correct maps that may have one or more geospatial features mislabeled).

In a first example, e.g., in accordance with the example method 200 of FIG. 2 for training a prediction model and determining a predicted earning value of a new cell site in a time interval by applying geospatial features of the new cell site as inputs to the prediction model and obtaining the predicted earning value as an output, AS 104 may calculate an earning value for each of cell sites 181 and 182 (or for each of NAP 191 and NAP 192, respectively). For instance, as noted above, DB(s) 106 may store records relating to calls made via each network access point (NAP) in a given time period, which can include identification of each unique endpoint device making a call in the time period via the NAP and the number of calls made by each such endpoint device via the NAP. The records may also include information regarding the total number of calls by each of the endpoint devices via any NAP in the system 100. Similarly, such records may also include, for each NAP, a data volume exchanged by each unique endpoint device via the NAP in the given time period, as well as a total data volume associated with each such endpoint device across the entire system 100 during the given time period. In still another example, such records may alternatively or additionally include service connection times for which a given endpoint device is attached to a particular NAP for service (as well as a total time attached to any NAP of the system 100).

In various examples, these metrics may be utilized to attribute a per-account and/or per-endpoint device earning value to each of NAP 191/cell site 181 and NAP 192/cell site 182 for the given time period, for instance, in accordance with any of Equations 1-3 above. In addition, the per-endpoint device earning values may be aggregated, e.g., in accordance with any of Equations 4 or 5 above (or with other variations, such as thresholding) to give an overall earning value of each of NAP 191/cell site 181 and NAP 192/cell site 182 for the given time period. Thus, AS 104 may possess the earning values of each of NAP 191/cell site 181 and NAP 192/cell site 182 for the given time period as well as the sets of geospatial features (e.g., instances of different types of geospatial categories, and the sizes thereof).

As also noted above, the present disclosure may train a prediction model (e.g., in one example, a CNN or other types of neural network) to predict/output a forecast earning value for a new cell site/NAP at a considered/candidate location. In particular, the prediction model may be trained with geospatial features of existing cell sites/NAPs as input features/predictors, and the known earning values of the cells sites as the labels (labeled outputs). In the example of FIG. 1, such a prediction model may be trained using data relating to cell site 181/NAP 191 and cell site 182/NAP 192 as training data (and/or testing data). The trained prediction model may then be used to predict the earning value in a time interval (e.g., of the same duration as the given time period to which the training data relates) for new cell sites/NAPs, such as new cell site 189 and new NAP 199.

In this case, AS 104 may refer to the same map(s) and/or aerial/overhead image(s) to determine geospatial features of the new cell site 189 (instances of different types of geospatial categories, the number and the sizes thereof, etc.). These geospatial features may then be input to the prediction model, which will output the forecast earning value of the new cell site 189/NAP 199. Notably, the prediction model accounts for similarities between and among NAPs/cell sites across geospatial features. Qualitatively, the new cell site 189/NAP 199 will be predicted to have an earning value that is similar to earning values of other cell sites that are the deemed similar across geospatial features. It should again be noted that the prediction model may be pre-trained for a region or zone of the system 100 in which the new cell site 189/NAP 199 is being considered for deployment, or may be trained after the location of the new cell site 189 is selected for consideration. In the latter case, AS 104 may select data relating to cell sites/NAPs that are within a threshold distance as training (and/or testing) data for building the prediction model. For instance, data for at least cell site 181/NAP 191 and cell site 182/NAP 192 may be selected due to the proximity of these to the new cell site 189. It should also be noted that the illustration of FIG. 1 is simplified and that in the same, other, further, and/or different examples, data from additional cell sites/NAPs may be used to train/build the prediction model.

In a second example, e.g., in accordance with the example method 300 of FIG. 3 for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance, AS 104 may alternatively calculate an earning value for each instance of each type of geospatial category within each of cell sites 181 and 182, respectively. For instance, AS 104 may perform similar operations as described above. However, instead of tracking a number of calls, call duration, data volume, or connection time per NAP (or per cell site) and calculating an earning value of the NAP/cell site per endpoint device, in this case AS 104 may track a number of calls, call duration, data volume, or connection time per location (or per instance of each geospatial category) within each of cell sites 181 and 182. For example, AS 104 may track a number of calls made by each unique endpoint device when determined to be present at the instance of building type 3 in cell site 181, a number of calls made by each unique endpoint device when determined to be present at a first instance of building type 1 in cell site 181, and also for a second instance of building type 1 in cell site 181. A similar process may be applied to instances of building type 2, road type 2, and road type 3, as described above. In one example, as also noted above, the data from which these metrics may be determined is stored in DB(s) 106.

In one example, AS 104 may next derive models for each type of geospatial category, e.g., a linear model which scales based upon the size of an instance of the type of geospatial category. For instance, AS 104 may gather metrics per the above for each instance of each type of geospatial category for a plurality of existing cell sites (e.g., including at least cell sites 181 and 182). Earning values of instances of a same type of geospatial category may be plotted or otherwise fitted to a linear prediction line which describes a ratio of the size of the instance to the earning value earned by the system 100 in a given time period for network usage from endpoint devices located at or within the instance. For example, on average, more revenue is derived from a large office building than a small office building, e.g., because the large office building generally has more people (and hence more subscribers/users making calls, using network data, etc.).

Continuing with the present example, AS 104 may then determine all of the instances of geospatial categories in new cell site 189, e.g., one instance of building type 1, five instances of building type 2, one instance of building type 3, two instances of road type 1, and one instance of a non-building predominated land (e.g., a park). For each instance of each type of geospatial category, AS 104 may also retrieve from one or more map(s) and/or determine from one or more aerial/overhead images, sizes of each instance. With this information and the linear models of each type of geospatial category, AS 104 may then determine a per-instance earning value during the given time period. The sum over all of the instances of different types of geospatial categories in cell site 189 may then be returned as the forecast earning value of the new cell site 189/new NAP 199 for a time interval of the same duration as the given time period over which the base data from cell sites 181, 182, etc. is/are obtained.

It should again be noted that in one example, models may be created for each type of geospatial category (e.g., different models for each building type, each road type, etc.) for a region or zone of the system 100, in advance. However, in another example, the models may be created for each building type, each road type, etc.) after the candidate location for new cell site 189/new NAP 199 is selected. For instance, the models for each building type, each road type, etc. may be built from data of cell sites/NAPs within a threshold distance from the new cell site 189/new NAP 199. In addition, this distance may vary depending upon whether the new cell site 189 is in a rural area, a suburban area, an urban area, etc. These and other aspects of the present disclosure are further discussed below in connection with the examples of FIGS. 2-4.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of telecommunication network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with telecommunication network 102 independently or in a chained manner. For example, device 113 and server 116 may access telecommunication network 102 via different access networks, devices 110 and 112 may access telecommunication network 102 via different access networks, and so forth. Thus, these and other modifications are all contemplated within the scope of the present disclosure.

FIG. 2 illustrates a flowchart of an example method 200 for training a prediction model and determining a predicted earning value of a new cell site in a time interval by applying geospatial features of the new cell site as inputs to the prediction model and obtaining the predicted earning value as an output. In one example, the method 200 is performed by a component of the system 100 of FIG. 1, such as by application server 104, and/or any one or more components thereof (e.g., a processor, or processors, performing operations stored in and loaded from a memory), or by application server 104, in conjunction with one or more other devices, such as DB(s) 106, server(s) 116, DB(s) 118, NAPs 191 and 192, devices 110-113, and so forth. In one example, the steps, functions, or operations of method 200 may be performed by a computing device or system 400, and/or processor 402 as described in connection with FIG. 4 below. For instance, the computing device or system 400 may represent any one or more components of application server 104, and so forth in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processing system. The method 200 begins in step 205 and may proceed to optional step 210 or to step 220.

At optional step 210, the processing system may identify a candidate location for deploying a new cell site. For instance, the candidate location may be obtained from network planning personnel of the cellular network or from another automated system that may identify areas without coverage or areas where network coverage may need to be improved.

At step 220, the processing system obtains usage volume information for a plurality of endpoint devices for at least one cell site of a cellular network. In one example, for each of the plurality of endpoint devices the usage volume information comprises a total usage volume via the cellular network in a given time period and a usage volume via the at least one cell site in the given time period. In one example, the at least one cell site comprises a plurality of cell sites. In addition, in one example, the plurality of cell sites may comprise cell sites within a threshold distance of the new cell site. As discussed above, the usage volume via the at least one cell site for each of the plurality of endpoint devices in the given time period may comprise at least one of: a number of calls via the at least one cell site (for the endpoint device), a data volume exchanged via the at least one cell site (for the endpoint device), or a duration of service time via the at least one cell site (for the endpoint device) (and similarly for the totals over the entire cellular network for each endpoint device that are utilized at step 230 below). In another example, the usage volume via the at least one cell site for each of the plurality of endpoint devices in the given time period comprises a weighted sum of at least two of the above metrics.

At step 230, the processing system determines at least one earning value of the at least one cell site in the given time period based upon a summation of an earning metric of each of the plurality of endpoint devices for the at least one cell site. For instance, the earning metric may comprise, for each of the plurality of endpoint devices: a total earning for the cellular network from the endpoint device in the given time period times a ratio of the usage volume via the at least one cell site in the given time period divided by the total usage volume via the cellular network in the given time period. In one example, the at least one cell site comprises a plurality of cell sites, and the at least one earning value comprises a plurality of earning values (e.g., one for each cell site). In one example, step 230 may include applying a thresholding as discussed above (wherein if a usage volume of an endpoint device via the at least one cell site exceeds a threshold, the entire revenue from the endpoint device may be attributed to the at least one cell site as the earning metric for that endpoint device).

At optional step 240, the processing system may obtain geospatial features for the at least one cell site.

At optional step 250, the processing system may obtain geospatial features for the new cell site. For example, the geospatial features for the at least one cell site and the geospatial features for the new cell site may be obtained from at least one of: at least one map or at least one overhead image. In one example, the at least one map can be labeled with the geospatial features. In one example, the at least one overhead image can be from a satellite or may comprise aircraft-obtained images. In addition, identification of geospatial features from overhead image(s) can be via ML-classifiers/detection models for different geospatial features. The geospatial features may comprise at least one of: a number of buildings of each of a plurality of building types of a given cell site of the plurality of cell sites, a size of the buildings of each of the plurality of building types of the given cell site, a length of roads of each of a plurality of road types of the given cell site, a volume of at least one non-building-predominated land type (e.g., park space, farmland, natural preserved space, etc.), and so forth.

At step 260, the processing system trains a prediction model to predict an earning value of the new cell site, where the prediction model is trained based upon geospatial features of the at least one cell site as predictor factors of the at least one earning value of the at least one cell site. For instance, the prediction model may comprise a CNN or other neural networks, or a different type of ML-based model, such as a SVM or the like. The prediction model may be trained as discussed above to predict an earning value of a new cell site (e.g., the earning value of a new network access point (NAP)).

At step 270, the processing system determines a predicted earning value of the new cell site in a time interval via the prediction model, where the determining comprises applying geospatial features of the new cell site as inputs to the prediction model and obtaining the predicted earning value as an output of the prediction model. For instance, the time interval may be of a same duration as the given time period from which the training data is collected. In this regard, it should be noted that to expand the training data set, training data from the at least one cell site may be obtained for a plurality of equal time periods over a longer time range, where each time period may have a different earning value attributed to the cell site/NAP where the geospatial features may remain the same or relatively the same.

At optional step 280, the processing system may select the new cell site for deploying at least one antenna in accordance with the predicted earning value. For instance, if the forecast earning value exceeds a threshold, or if the forecast earning value ranks the new cell site higher than other candidate new cell sites, etc., then the new cell site may be selected for deploying at least one antenna (e.g., a new network access point, which may comprise at least one antenna, a tower and/or several antennas or antenna arrays in one or more sectors, etc.).

Following step 270, or optional step 280 the method 200 proceeds to step 295 where the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200 for additional cell sites. In another example, the method 200 may be expanded to include calculating earning value(s) of the at least one cell site from unique endpoint devices in multiple ways, and then selecting the highest value(s), generating weighted averages, etc., e.g., as discussed above in connection with equations 1-5. In another example, the method 200 may be modified such that optional step 210 follows step 260. In still another example, the method 200 may include obtaining demographic features for the at least one cell site and demographic features for the new cell site, where step 260 may further include training the prediction model with demographic features of the at least one cell site as additional inputs/predictors, and where step 270 may further comprise applying demographic features of the new cell site as additional inputs to the prediction model. Thus, these and other modifications are all contemplated within the scope of the present disclosure.

FIG. 3 illustrates a flowchart of an example method 300 for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance. In one example, the method 300 is performed by a component of the system 100 of FIG. 1, such as by application server 104, and/or any one or more components thereof (e.g., a processor, or processors, performing operations stored in and loaded from a memory), or by application server 104, in conjunction with one or more other devices, such as DB(s) 106, server(s) 116, DB(s) 118, NAPs 191 and 192, devices 110-113, and so forth. In one example, the steps, functions, or operations of method 300 may be performed by a computing device or system 400, and/or processor 402 as described in connection with FIG. 4 below. For instance, the computing device or system 400 may represent any one or more components of application server 104, and so forth in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system may identify a candidate location for deploying a new cell site (in other words, a "candidate cell site"). For instance, optional step 310 may be the same as or similar to optional step 210 of the method 200 discussed above.

At optional step 320, the processing system identifies at least a first instance of at least a first type of geospatial category within at least one cell site. In one example, the at least one cell site may be selected at optional step 320 when within a certain distance of the location of the candidate cell site (e.g., within 1 mile, within 5 miles, within 50 miles, etc.). In one example, the distance may be set differently for different types of environments, e.g., 1 mile for urban area, 3 miles for suburban area or 10 miles for suburban area, etc., 20 miles for rural area or 50 mines for rural area, and so on. In one example, the distance may be increased incrementally until a threshold minimum number of cells sites are available for data collection, and/or until there is at least one or other minimum number of instances of each geospatial category for which an instance of the geospatial category is determined to be within the candidate cell site. In one example, the processing system may also retrieve from one or more map(s) and/or determine from one or more aerial/overhead images, a size of the at least a first instance of at least a first type of geospatial category within at least one cell site (e.g., for a building, a footprint area, a number of floor/stories, etc., for a road, a length, a paved area, etc.). In one example, optional step 320, may include the processing system identifying at least a third instance of at least a second type of geospatial category within the at least one cell site in the given time period (and so on for other instances of the first type of geospatial category, other instances of the second type of geospatial category, one or more instances of one or more further types of geospatial categories, and so forth).

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At step 330, the processing system obtaining usage volume information for a plurality of endpoint devices receiving services from at least one cell site of a cellular network when determined to be present within at least a first instance of at least a first type of geospatial category within the at least one cell site. For instance, for each of the plurality of endpoint devices the usage volume information may comprise a total usage volume via the cellular network in a given time period and a usage volume when determined to be present within the at least the first instance of the at least the first type of geospatial category within the at least one cell site in the given time period. For instance, the first type of geospatial category may be one of a plurality of types of geospatial categories, e.g., including: a plurality of building types, a plurality of roadway types, or a plurality of non-building-predominated land types. For instance, building types can be single family residential, townhouses, condominiums, apartment buildings, office buildings, arena, hospitals, etc. In one example, office buildings and apartment buildings can be further broken down into high-rise and low-rise, etc. In addition, roadway types may include highways, large roads, dense residential roads, light residential roads, suburban residential roads, suburban commercial roads (where primarily commercial properties adjoin the road), rural paved roads, rural un-paved roads, etc. Similarly, non-building-predominated land types may include (non-professional) outdoor sports complexes, parks, nature preserves, wetlands, farms, etc. (where there may be structures, but these are incidental to overwhelmingly outdoor activities/land usage).

In one example, the usage volume when determined to be present within the at least the first location of the at least the first type of geospatial category within the at least one cell site comprises, for each of the plurality of endpoint devices in the given time period, at least one of: a number of calls via the at least one cell site when determined to be present within the at least the first instance (for the endpoint device), a data volume exchanged via the at least one cell site when determined to be present within the at least the first instance (for the endpoint device), or a duration of service time via the at least one cell site when determined to be present within the at least the first instance (for the endpoint device). In another example, the usage volume when determined to be present within the at least the first instance of the at least the first type of geospatial category within the at least one cell site comprises, for each of the plurality of endpoint devices in the given time period, a weighted sum of at least two of the foregoing metrics.

In one example, presence within at least the first instance of the at least the first geospatial category may be determined from collecting endpoint device location data (which may be voluntarily reported by at least some endpoint devices serviced by the at least one cell). In one example, the locations of other endpoint devices may be estimated based upon extrapolation from those endpoint devices reporting locations, e.g., when 25% of calls serviced by the cell site/network access point (NAP) for endpoint devices with reportable locations are from endpoint devices located at a hospital, then 25% of all calls serviced by the cell site/NAP may be attributed to the hospital, and so on for other instances of the same geospatial category or other instances of different geospatial categories.

At step 340, the processing system determines at least a first earning value of the at least the first instance of the at least the first type of geospatial category in the given time period based upon a summation of a first earning metric of each of the plurality of endpoint devices for the at least the first instance of the at least the first type of geospatial category. For instance, the first earning metric may comprise for each of the plurality of endpoint devices: a total earning for the cellular network from the endpoint device in the given time period times a ratio of the usage volume when determined to be present within the at least the first instance of the at least the first type of geospatial category in the given time period divided by the total usage volume via the cellular network in the given time period.

At step 350, the processing system identifies at least a second instance of the at least the first type of geospatial category within the candidate cell site. For instance, the at least the first instance of the at least the first type of geospatial category in the at least one cell site and the at least the second instance of the first type of geospatial category in the candidate cell site may be identified based upon at least one of: at least one map or at least one overhead image (e.g., including satellite images and/or aircraft-captured images). For instance, as noted above, identification of geospatial features from overhead image(s) can be via ML-classifiers/detection models for different geospatial features. In one example, step 350 may include identifying a size of the at least the second instance of the at least the first type of geospatial category. In one example, step 350 may be the same as or similar to optional step 240 of the method 200.

In one example, the usage volume information for the plurality of endpoint devices obtained at step 330 may further comprise, for each of the plurality of endpoint devices, a usage volume when determined to be present within at least a third instance of at least a second type of geospatial category within the at least one cell site in the given time period.

In this regard, in one example, the method 300 may include optional step 360, in which the processing system may determine at least a second earning value of the at least the third instance of the at least the second type of geospatial category in the given time period based upon a summation of a second earning metric of each of the plurality of endpoint devices for the at least the third instance of the at least the second type of geospatial category. For instance, the second earning metric may comprise for each of the plurality of endpoint devices: a total earning for the cellular network from the endpoint device in the given time period times a ratio of the usage volume when determined to be present within the at least the third instance of the at least the second type of geospatial category in the given time period divided by the total usage volume via the cellular network in the given time period.

At optional step 370, the processing system may identify at least a fourth instance of the at least the second type of geospatial category within the candidate cell site. For instance, the identification may be using the same techniques described above to identify the at least the fourth instance via one or more maps (e.g., from one or more map labels) or via one or more aerial images. It should be noted that additional optional steps such as optional steps 360 and 370 may be involved depending upon the number of instances of different types of geospatial categories that is/are found in the candidate cell site (and/or in the at least one cell site). In one example, the processing system may also retrieve from one or more map(s) and/or determine from one or more aerial/overhead images a size of the at least the fourth instance of the at least the second type of geospatial category.

At step 380, the processing system determines a predicted earning value of the candidate cell site in a time interval based upon the at least the first earning value and a first scaling factor based upon a size of the at least the second instance and a size of the at least the first instance. It should be noted that the at least the first instance of the at least the first geospatial category may be just one instance of the first geospatial category within the same cell site or a plurality of different cell sites from which collected data may be used to determine the predicted earning value for the new cell site (or "candidate cell site"). Thus, the predicted earning value of the candidate cell site may be based upon a plurality of earning values relating to different instances of the first geospatial category from the same cell site or the plurality of different cell sites. For example, the first geospatial category (and each of the other geospatial categories) may have a linear scaling model that correlates a size of an instance of the geospatial category with an earning value. Thus, the scaling factor may be in accordance with the linear scaling model based upon the plurality of earning values and associated sizes or the plurality of instances of the first geospatial category.

Similarly, the first geospatial category may be just one geospatial category for which instances are found in the candidate cell site. Thus, for example, the predicted earning value of the candidate cell site in the time interval may be further determined based upon the at least second earning value (e.g., as determined at optional step 360 and a second scaling factor based upon a size of the at least the third instance and a size of the at least the fourth instance), and so on for other instances of the same or different geospatial categories (if any). For instance, the processing system may determine a per instance earning value during the given time period. The sum over all of the instances of all of the types of geospatial categories in the candidate cell site may then be returned as the forecast earning value of the candidate cell site for the time interval.

At optional step 390, the processing system may select the candidate cell site for deploying at least one antenna in accordance with the predicted earning value. For instance, optional step 390 may be the same as or similar to optional step 280 of the method 200 discussed above.

Following step 380, or optional step 390, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 for additional candidate cell sites or different locations for a same candidate cell site. In still another example, step 340 may precede step 320 (and similarly for optional step 360). In this regard, it should be noted that in one example, the at least one cell site may be selected at step 320 using an incrementally expanding threshold distance until there is at least one or other minimum number of instances of each geospatial category for which an instance of the geospatial category is determined to be within the candidate cell site. In other words, if the candidate cell site is determine to have an instance of the first type of geospatial category, the threshold distance may be expanded until an existing cell site in the network is found that also has an instance of the first type of geospatial category. Thus, these and other modifications are all contemplated within the scope of the present disclosure.

In addition, although not expressly specified above, one or more steps of the method 200 or the method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIGS. 2 and 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the example methods 200 and 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for training a prediction model and determining a predicted earning value of a new cell site in a time interval by applying geospatial features of the new cell site as inputs to the prediction model and obtaining the predicted earning value as an output and/or for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for training a prediction model and determining a predicted earning value of a new cell site in a time interval by applying geospatial features of the new cell site as inputs to the prediction model and obtaining the predicted earning value as an output and/or for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance (e.g., a software program comprising computer-executable instructions) can be loaded into memory 404 and executed by hardware processor element 402 to implement the steps, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for training a prediction model and determining a predicted earning value of a new cell site in a time interval by applying geospatial features of the new cell site as inputs to the prediction model and obtaining the predicted earning value as an output and/or for identifying a second instance of a geospatial category within a candidate cell site and determining a predicted earning value of the candidate cell site in a time interval based upon at least a first earning value for at least a first instance of the geospatial category within at least one cell site and a scaling factor based upon a size of the at least the second instance and a size of the at least the first instance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, usage volume information for a plurality of endpoint devices for at least one cell site of a cellular network, wherein for each of the plurality of endpoint devices the usage volume information comprises a total usage volume via the cellular network in a given time period and a usage volume via the at least one cell site in the given time period;
determining, by the processing system, at least one earning value of the at least one cell site in the given time period based upon a summation of an earning metric of each of the plurality of endpoint devices for the at least one cell site, wherein the earning metric comprises for each of the plurality of endpoint devices: a total earning for the cellular network from the endpoint device in the given time period times a ratio of the usage volume via the at least one cell site in the given time period divided by the total usage volume via the cellular network in the given time period;

training, by the processing system, a prediction model to predict an earning value of a new cell site, wherein the prediction model is trained based upon geospatial features of the at least one cell site as predictor factors of the at least one earning value of the at least one cell site; and determining, by the processing system, a predicted earning value of the new cell site in a time interval via the prediction model, wherein the determining comprises applying geospatial features of the new cell site as inputs to the prediction model and obtaining the predicted earning value as an output of the prediction model.

2. The method of claim 1, further comprising:
selecting the new cell site for deploying at least one antenna in accordance with the predicted earning value.

3. The method of claim 1, further comprising:
identifying a candidate location for deploying the new cell site prior to the training.

4. The method of claim 1, wherein the at least one cell site comprises a plurality of cell sites, and wherein the at least one earning value comprises a plurality of earning values.

5. The method of claim 4, wherein the plurality of cell sites comprises cell sites within a threshold distance of the new cell site.

6. The method of claim 4, wherein the geospatial features comprise at least one of:
a number of buildings of each of a plurality of building types of a given cell site of the plurality of cell sites; or
a size of the buildings of each of the plurality of building types of the given cell site.

7. The method of claim 6, wherein the geospatial features further comprise at least one of:
a length of roads of each of a plurality of road types of the given cell site; or
a number of lanes of the roads of each of the plurality of road types of the given cell site.

8. The method of claim 6, wherein the geospatial features further comprise at least one of:
a volume of at least one non-building-predominated land type for the given cell site.

9. The method of claim 1, further comprising:
obtaining the geospatial features for the at least one cell site; and
obtaining the geospatial features for the new cell site.

10. The method of claim 8, wherein the geospatial features for the at least one cell site and the geospatial features for the new cell site are obtained from at least one of:
at least one map; or
at least one overhead image.

11. The method of claim 1, wherein the usage volume via the at least one cell site for each of the plurality of endpoint devices in the given time period comprises at least one of:
a number of calls via the at least one cell site;
a data volume exchanged via the at least one cell site; or
a duration of service time via the at least one cell site.

12. The method of claim 11, wherein the usage volume via the at least one cell site for each of the plurality of endpoint devices in the given time period comprises a weighted sum of at least two of:
the number of calls via the at least one cell site;
the data volume exchanged via the at least one cell site; or
the duration of service time via the at least one cell site.

13. A non-transitory computer-readable medium storing instructions which, when executed by a processing system including at least one processor, cause the processing system to perform operations, the operations comprising:

obtaining usage volume information for a plurality of endpoint devices for at least one cell site of a cellular network, wherein for each of the plurality of endpoint devices the usage volume information comprises a total usage volume via the cellular network in a given time period and a usage volume via the at least one cell site in the given time period;

determining at least one earning value of the at least one cell site in the given time period based upon a summation of an earning metric of each of the plurality of endpoint devices for the at least one cell site, wherein the earning metric comprises for each of the plurality of endpoint devices: a total earning for the cellular network from the endpoint device in the given time period times a ratio of the usage volume via the at least one cell site in the given time period divided by the total usage volume via the cellular network in the given time period;

training a prediction model to predict an earning value of a new cell site, wherein the prediction model is trained based upon geospatial features of the at least one cell site as predictor factors of the at least one earning value of the at least one cell site; and determining a predicted earning value of the new cell site in a time interval via the prediction model, wherein the determining comprises applying geospatial features of the new cell site as inputs to the prediction model and obtaining the predicted earning value as an output of the prediction model.

14. A method comprising:
obtaining usage volume information for a plurality of endpoint devices receiving services from at least one cell site of a cellular network when determined to be present within at least a first instance of at least a first type of geospatial category within the at least one cell site, wherein for each of the plurality of endpoint devices the usage volume information comprises a total usage volume via the cellular network in a given time period and a usage volume when determined to be present within the at least the first instance of the at least the first type of geospatial category within the at least one cell site in the given time period;

determining at least a first earning value of the at least the first instance of the at least the first type of geospatial category in the given time period based upon a summation of a first earning metric of each of the plurality of endpoint devices for the at least the first instance of the at least the first type of geospatial category, wherein the first earning metric comprises for each of the plurality of endpoint devices: a total earning for the cellular network from the endpoint device in the given time period times a ratio of the usage volume when determined to be present within the at least the first instance of the at least the first type of geospatial category in the given time period divided by the total usage volume via the cellular network in the given time period;

identifying at least a second instance of the at least the first type of geospatial category within a candidate cell site; and determining a predicted earning value of the candidate cell site in a time interval based upon the at least the first earning value and a first scaling factor based upon a size of the at least the second instance and a size of the at least the first instance.

15. The method of claim 14, further comprising:
selecting the candidate cell site for deploying at least one antenna in accordance with the predicted earning value.

16. The method of claim 15, wherein the usage volume information for the plurality of endpoint devices further comprises, for each of the plurality of endpoint devices, a usage volume when determined to be present within at least a third instance of at least a second type of geospatial category within the at least one cell site in the given time period, the method further comprising:
determining at least a second earning value of the at least the third instance of the at least the second type of geospatial category in the given time period based upon a summation of a second earning metric of each of the plurality of endpoint devices for the at least the third instance of the at least the second type of geospatial category, wherein the second earning metric comprises for each of the plurality of endpoint devices: a total earning for the cellular network from the endpoint device in the given time period times a ratio of the usage volume when determined to be present within the at least the third instance of the at least the second type of geospatial category in the given time period divided by the total usage volume via the cellular network in the given time period.

17. The method of claim 16, further comprising:
identifying at least a fourth instance of the at least the second type of geospatial category within the candidate cell site, wherein the predicted earning value of the candidate cell site in the time interval is further determined based upon the at least second earning value and a second scaling factor based upon a size of the at least the third instance and a size of the at least the fourth instance.

18. The method of claim 14, wherein the first type of geospatial category is one of a plurality of types of geospatial categories, wherein the plurality of geospatial categories comprises at least one of:
a plurality of building types;
a plurality of roadway types; or
a plurality of non-building-predominated land types.

19. The method of claim 14, wherein the at least the first instance of the at least the first type of geospatial category in the at least one cell site and the at least the second instance of the first type of geospatial category in the candidate cell site are identified based upon at least one of:
at least one map; or
at least one overhead image.

20. The method of claim 14, wherein the usage volume when determined to be present within the at least the first location of the at least the first type of geospatial category within the at least one cell site comprises, for each of the plurality of endpoint devices in the given time period, at least one of:
a number of calls via the at least one cell site when determined to be present within the at least the first instance;
a data volume exchanged via the at least one cell site when determined to be present within the at least the first instance; or
a duration of service time via the at least one cell site when determined to be present within the at least the first instance.

* * * * *